United States Patent [19]

Zsida

[11] Patent Number: 4,682,582
[45] Date of Patent: Jul. 28, 1987

[54] SOLAR ENERGY COLLECTOR AND SUN MOTOR UTILIZING SAME

[75] Inventor: Attila Zsida, Ridgewood, N.Y.
[73] Assignee: Christiane Grams, Ridgewood, N.Y.
[21] Appl. No.: 723,195
[22] Filed: Apr. 15, 1985
[51] Int. Cl.[4] .................................. F24J 2/08
[52] U.S. Cl. .................... 126/440; 126/438; 60/641.15
[58] Field of Search ............... 60/517, 641.8, 641.13, 60/641.14, 641.15; 126/438, 439, 440, 441

[56] References Cited

U.S. PATENT DOCUMENTS

| | | | |
|---|---|---|---|
| 4,033,134 | 7/1977 | Bentley | 60/641.8 |
| 4,043,315 | 8/1977 | Cooper | 126/440 X |
| 4,354,348 | 10/1982 | Lee | 126/440 X |

FOREIGN PATENT DOCUMENTS 92753  6/1983  Japan .................... 126/440

*Primary Examiner*—Stephen F. Husar
*Attorney, Agent, or Firm*—Charles E. Baxley

[57] ABSTRACT

A solar energy collector comprises at least a first lens system having a first convex outer light receiving face facing generally in a first direction and having a first series of condensing lens elements, each having a focal plane. The focal plane of the first system collectively define a first focal surface and first metal element means is located in the first focal surface, embedded in the material of the first system. A sun motor incorporating the collector further includes at least one cylinder attached to the collector through an aperture therein. A drive room is aligned with the cylinder and contains a pair of flywheels having confronting grooves. The cylinder contains a piston which is fixedly connected to the flywheels by a piston rod. Driven shaft means are coaxial with the flywheels. A displacer rod has at its upper end a valve which opens and closes an aperture in the collector and extends through the piston rod to its lower end where it engages and follows confronting grooves in the flywheels.

14 Claims, 1 Drawing Figure

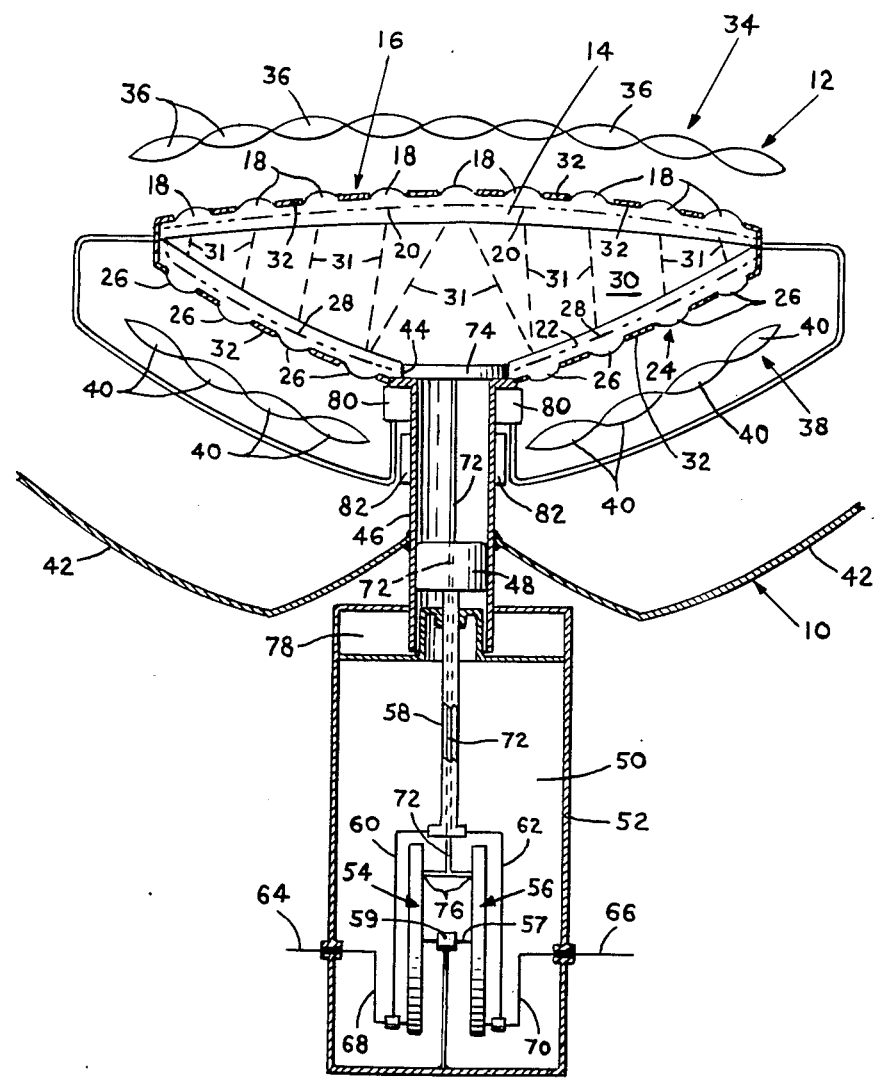

SOLAR ENERGY COLLECTOR AND SUN MOTOR UTILIZING SAME

BACKGROUND OF THE INVENTION

This invention pertains to a solar energy collector and to a sun motor utilizing the collector. The motor converts solar energy into rotary motion.

Various prior art proposals exist for the utilization of solar energy, falling into several categories, among which are converting solar energy to: steam or superheated steam; energy for heating and/or cooling buildings and the like; and mechanical motion, either reciprocal or rotary.

Exemplary of these prior art proposals are those of the following U.S. Pat. Nos.: Agnew 2,636,129 granted Apr. 21, 1953; Bask 4,002,032 granted Jan. 11, 1977; Dimitroff 4,068,474 granted Jan. 17, 1978; Chromie 4,198,826 granted Apr. 22, 1980; Hunt 4,313,304 granted Feb. 2, 1983; Almstrom et al. 4,457,133 granted July 3, 1984. It is believed that none of these prior art proposals are relevant to the present invention.

Important objects of the invention are to provide an improved solar energy collector which is relatively inexpensive and simple in construction and efficient in operation and to provide an improved sun motor utilizing the inventive collector, which motor is relatively inexpensive and simple in construction and efficient in operation, and more particularly the output of the motor being rotary motion.

The inventive collector is useful in other types of motors than that disclosed herein.

Other objects and advantages will become apparent as the invention is described in detail below.

SUMMARY OF THE INVENTION

A solar energy collector embodying the invention comprises at least a first lens system having a first convex outer light receiving face facing generally in a first direction and having a first series of condensing lens elements, each of which has a focal plane. The focal planes of the first system collectively define a first focal surface. First metal element means is in the first focal surface and is embedded in material of the first system.

The disclosed collector further comprises a second lens system having a second convex outer light receiving face facing generally in a second direction which is opposite to the first direction and having a second series of condensing lens elements, each of which has a focal plane. The focal planes of the second system collectively define a second focal surface. Second metal element means is in the second focal surface and is embedded in material of the second system.

The first and second systems have outer peripheries which are joined together, to provide a heating chamber and the second system has a central aperture therethrough.

A sun motor embodying the invention comprises a solar energy collector as outlined above, a cylinder attached to the second lens member through the aperture in the second lens member, a piston in the cylinder, a drive room aligned with the cylinder such that the cylinder is between the second lens member and the drive room. The drive room has a wall and contains first and second coaxial flywheels having confronting grooves. The flywheel axis is perpendicular to the cylinder axis and the flywheels are located on opposite sides of and equidistant from the cylinder axis. A piston is in the cylinder. A piston rod is movable with the piston and is fixedly connected with the flywheels. The motor also comprises driven shaft means coaxial with the flywheels and rotatable therewith and extending through the drive room wall.

A displacer rod has at its upper end a valve which opens and closes the aperture and extends from the chamber through the piston and the piston rod and engages the confronting flywheel grooves. A buffer is located between the cylinder and the drive room and a gas regenerating system is provided for returning spent gas to the chamber. A cooling system surrounds the cylinder for cooling the gas.

As described in detail hereinafter, the sun motor converts solar energy into rotary motion.

DESCRIPTION OF THE DRAWING

The single FIGURE is a somewhat schematic axial section of a preferred solar energy collector and other elements of a preferred sun motor.

DESCRIPTION OF THE PREFERRED EMBODIMENT

The drawing shows a sun motor, indicated generally at 10, which includes a solar energy collector, indicated generally at 12.

Collector 12 has a first lens system including a first lens member 14 having a first convex outer light receiving face 16 facing in a first direction, i.e., vertically upwardly, and having thereon a first series of condensing lens elements 18, each having a focal plane. The focal planes of lens elements 18 collectively define a first focal surface. First metal element means, which as shown is a unitary grid 20 is provided, lying in the first focal surface. The first focal surface is within the material of lens member 14, and grid 20 is embedded in that material. Lens member 14 is of substantially uniform thickness.

Collector 12 further includes a second lens system including a second member 22 having a second convex outer light receiving face 24 facing generally in a second direction, i.e., vertically downwardly, which is opposite to the direction faced by light receiving face 16 of lens member 14. Light receiving face 24 has thereon a second series of condensing lens elements 26, each having a focal plane. The focal planes of lens elements 26 collectively define a second focal surface. Second metal element means, which as shown is a unitary grid 28 is provided, lying in the second focal surface. The second focal surface is within the material of lens member 22, and grid 28 is embedded in that material. Lens member 22 is of substantially uniform thickness.

Examples of suitable materials for grids 20 and 28 are tungsten and tantalum.

Lens members 14 and 22 have outer peripheries which are joined together to provide a heating chamber 30 between members 14 and 22. Chamber 30 contains displacer means indicated schematically at 31, this feature being well known from the Stirling hot gas or air engine.

Lens elements 18 are separated from one another by non-optical portions, and lens elements 26 are separated from one another by non-optical portions. These non-optical portions are preferably blackened on the outside as indicated at 32 to take advantage of the black body effect.

The first lens system of collector 12 further includes an optical dome 34 spaced from convex outer light receiving face 16, dome 34 comprising further condensing lens elements 36 which are associated with lens elements 18. Lens elements 36 receive direct solar energy and concentrate same on lens elements 18. Lens elements 36 are associated with lens elements 18 in a one-to-one relationship.

The second lens system of collector 12 also includes an optical dish 38 spaced from convex outer light receiving face 24, dish 38 comprising additional condensing lens elements 40 associated with lens elements 26. Lens elements 40 receive reflected solar energy and concentrate same on lens elements 26. Lens elements 40 are associated with lens elements 26 in a one-to-one relationship.

Collector 12 also comprises a parabolic reflector 42 spaced from dish 38 for receiving solar energy and reflecting same into impingement on additional lens elements 40.

Second lens member 24 has a centrally located circular aperture 44 therethrough.

If desired, members 14 and 22 may be modified by omitting lens elements 18 and 26 and replacing same with non-optical windows, in which case the focal planes of condensing lens elements 36 of dome 34 and of condensing lens elements 40 of dish 38 collectively define the first and second focal surfaces, respectively, which are within the material of the so modified members 14 and 22, respectively.

The specific manner of mounting the various components of collector 12 in the illustrated positions is not shown and is conventional, being well known to those skilled in the art.

Lens members 14 and 22 and dome 34 and dish 38 may be fabricated of any glass or plastic materials known to be suitable.

Furthermore, the manner of joining together the outer peripheries of lens members 14 and 22 is conventional, being well known to those skilled in the art.

In addition to collector 12, sun motor 10 also includes a cylinder 46 attached, with is axis vertical, to chamber 30 through aperture 44, it being noted that reflector 42 surrounds and engages cylinder 46 and that dish 38 also surrounds cylinder 46. Motor 10 can, if desired, include a plurality of cylinders 46.

Cylinder 46 contains a piston 48 and a drive room 50 is aligned with cylinder 46 such that cylinder 46 is between lens member 22 and drive room 50. Drive room 50 has a wall 52 and contains first and second coaxial flywheels 54 and 56 having confronting grooves (not shown). The axis of flywheels 54 and 56 is perpendicular to the axis of cylinder 46 and flywheels 54 and 56 are located on opposite sides of and equidistant from the axis of cylinder 46.

A piston rod 58 is movable with piston 48 and is fixedly connected to flywheels 54 nd 56 by connecting rods 60 and 62, respectively. Driven shaft means in the form of shafts 64 and 66 are parallel to the flywheel axis and extend through wall 52 and are connected to flywheels 54 and 56 and are rotatable therewith by means of cranks 68 and 70 which engage flywheels 54 and 56 through connecting rods 60 and 62, respectively. Flywheels 54 and 56 have a common axle 57 rotatable in a bearing 59.

A displacer rod 72 has at its upper end a valve 74 and displacer 30 and extends through piston 48 and piston rod 58 to its lower end where it engages and follows the confronting grooves of flywheels 54 and 56, as schematically indicated at 76. Valve 74 functions to open and close aperture 44.

Motor 10 further includes a buffer room 78 between cylinder 46 and drive room 50 and a gas regenerator system, indicated generally at 80, for returning spent gas to chamber 30.

Motor 10 also includes a cooling system 82 surrounding cylinder 46.

The operation of sun motor 10 will now be described.

Solar energy impinges on collector 12, directly through dome 34 and indirectly by reflector 42 through dish 38 and is thereby concentrated into lens member 14 through face 16 and into lens member 22 through face 24 and is further concentrated by lens elements 18 and 26 onto grids 20 and 28 which may thereby attain, by radiation, a working gas temperature in chamber 30 in a range between about 400° F. and 1200° F.

As the working gas expands, a certain pressure is reached in the upper part of chamber 30, as well as in the lower part thereof. When the pressure in the lower part approximates that in the upper part, displacer rod 72 moves upwardly, opening valve 74 to allow working gas to engage piston 48 which is at that time at or near its uppermost point. Pressure compensation takes place, forcing piston 48 downwardly. Displacer rod valve 74 then closes off cylinder 46 by moving downwardly, and the increased gas pressure moves piston 48 downwardly, rotating flywheels 54 and 56 and driven shafts 64 and 66 in a given direction, a known rotation prevention device (not shown) being provided to prevent rotation in the opposite direction. When piston 48 moves upwardly, normally closed holes (not shown) in the wall of cylinder 46 open in conventional fashion, enabling egress of spent working gas from cylinder 46 into regenerator system 80 and return of the gas to chamber 30. The cycle then starts over again.

Buffer 78 is a simple chamber with feedback control and functions as a balancer of pressure on both sides of piston 48.

It is noted that displacer rod 72 follows the grooves in flywheels 54 and 56 and thus runs in bearings, which provide a fixed position for its vertical direction.

Sun motor 10 can attain and maintain a speed of about 1,000 r.p.m. to 2,000 r.p.m.

From the top, collector 12 is circular, in the case of a single cylinder motor 10, and elliptical in the case of a multi-cylinder motor 10. In the case of a single cylinder moter 10, the diameter may be about three feet, and if there are four cylinders 46, the ellipse may have a major dimension of about four feet.

When motor 10 stops, valve 74 is in its open position and piston 48 is in its highest position. When the sun rises, pressure builds up in collector 30, and piston 48 is caused to move downwardly, thus to start motor 10.

From the foregoing it is apparent that the invention provides an improved sun motor and solar energy collector.

Also, and as stated above, a solar energy collector embodying the invention can be used otherwise than as a component of a sun motor embodying the invention.

The disclosed details are exemplary only, the true scope of the invention being defined by the appended claims.

I claim:

1. A solar energy collector comprising a lens system having a convex outer light receiving face and having a series of condensing lens elements, each having a focal plane, said focal planes of said lens system collectively defining a focal surface, and metal element means located in said focal surface, said focal surface located within the material of said lens system and said metal element means being embedded within the material of said lens system.

2. A solar energy collector comprising at least a first lens system having a first convex outer light receiving face facing generally in a first direction and having a first series of condensing lens elements, each having a focal plane, said focal planes of said first lens system collectively defining a first focal surface, and first metal element means located in said first focal surface, and wherein said first system includes a first lens member having thereon said first series of condensing lens elements and said first focal surface is within the material of said first member and said first metal element means is a first unitary grid embedded within the material of said first member.

3. A collector according to claim 2 further comprising a second lens system having a second convex outer light receiving face facing generally in a second direction which is opposite to said first direction and having a second series of condensing lens elements, each having a focal plane, said focal planes of said second lens system collectively defining a second focal surface, and second metal element means located in said second focal surface, said second system including a second lens member having thereon said second series of condensing lens elements, said second focal surface being within the material of said second member and said second metal element means being a second unitary grid embedded within the material of said second member.

4. A collector according to claim 3 wherein said first and second members have outer peripheries joined together to provide a heating chamber between said first and second member.

5. A collector according to claim 3 wherein in use said first direction is vertically upward and said second direction is vertically downward.

6. A collector according to claim 2 wherein said lens elements of said first series are separated from one another by non-optical portions and said first system further includes an optical dome spaced from said first convex outer light receiving face, said dome comprising further condensing lens elements associated with said lens elements of said first lens member to receive direct solar energy and concentrate same on said lens elements of said lens member.

7. A collector according to claim 6 wherein said lens elements of said dome are associated with said lens elements of said first lens member in a one-to-one relationship.

8. A collector according to claim 4 wherein said lens elements of said second series are separated from one another by non-optical portions and said second system further includes an optical dish spaced from said second convex outer light receiving face, said dish comprising additional condensing lens elements associated with said lens elements of said second series to receive reflected solar energy and concentrate same on said lens elements of said second lens member.

9. A collector according to claim 8 wherein said lens elements of said dish are associated with said lens elements of said second lens member series in a one-to-one relationship.

10. A collector according to claim 8 further comprising a parabolic reflector spaced from said optical dish for receiving solar energy and reflecting same into impingement on said additional lens elements.

11. A collector according to claim 6 wherein said non-optical portions of said first outer light receiving face are blackened on the outside.

12. A collector according to claim 8 wherein said non-optical portions of said second outer light receiving face are blackened on the outside.

13. A collector according to claim 4 wherein said lens elements of said first and second series are separated from one another by non-optical portions and said first lens system further includes an optical dome spaced from said first convex outer light receiving face and comprising further condensing lens elements associated with said lens elements of said first series to receive direct solar energy and concentrate same on said lens elements of said first series, and said second lens system further includes an optical dish spaced from said second convex outer light receiving face, said dish comprising additional condensing lens elements associated with said lens elements of said second series to receive reflected solar energy and concentrate same on said lens elements of said second series, and said collector further comprises a parabolic reflector spaced from said optical dish for receiving solar energy and reflecting same into impingement on said additional lens elements.

14. A collector according to claim 13 wherein said non-optical portions of said first and second outer light receiving faces are blackened on the outside.

* * * * *